(12) United States Patent
Takahashi et al.

(10) Patent No.: US 11,834,970 B2
(45) Date of Patent: Dec. 5, 2023

(54) VALVE TIMING ADJUSTMENT DEVICE

(71) Applicant: DENSO CORPORATION, Kariya (JP)

(72) Inventors: Hiroki Takahashi, Kariya (JP); Yoshiki Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 17/674,997

(22) Filed: Feb. 18, 2022

(65) Prior Publication Data
US 2022/0170394 A1    Jun. 2, 2022

Related U.S. Application Data

(63) Continuation of application No. PCT/JP2020/031155, filed on Aug. 18, 2020.

(30) Foreign Application Priority Data

Aug. 22, 2019 (JP) .................. 2019-151858

(51) Int. Cl.
*F02D 13/02* (2006.01)
*F01L 13/00* (2006.01)
*F01L 1/344* (2006.01)

(52) U.S. Cl.
CPC .......... *F01L 1/344* (2013.01); *F02D 13/0215* (2013.01); *F01L 2013/103* (2013.01); *F01L 2820/041* (2013.01)

(58) Field of Classification Search
CPC .......... F01L 2013/103; F01L 2820/041; F02D 13/0215
See application file for complete search history.

(56) References Cited

U.S. PATENT DOCUMENTS

2005/0235937 A1    10/2005    Tani

*Primary Examiner* — Ngoc T Nguyen
(74) *Attorney, Agent, or Firm* — Nixon & Vanderhye P.C.

(57) ABSTRACT

Hall sensors respectively output a measurement signal, a voltage level of which changes according to a rotation position of an electric motor. A rotation signal generator of a drive circuit generates a rotation speed signal and a rotation direction signal of the electric motor based on the measurement signals. A control circuit generates control signals of the electric motor according to edges of output signals of the rotation signal generator. A signal corrector corrects an excess or a shortage of the edge of the signal at the time of starting the electric motor based on: the voltage levels of the rotation speed signal and the rotation direction signal at the time of turning off and the time of turning on of an electric power source; and a rotation direction of the electric motor at the time of starting thereof.

2 Claims, 9 Drawing Sheets

| ROTATION POSITION (DEGREES) | OUTPUT OF HALL SENSOR | | | OUTPUT OF ROTATION SIGNAL GENERATOR |
|---|---|---|---|---|
| | 9v | 9w | 9u | |
| 0 | Low | Low | High | Low |
| 15 | Low | High | High | High |
| 30 | Low | High | Low | Low |
| 45 | High | High | Low | High |
| 60 | High | Low | Low | Low |
| 75 | High | Low | High | High |
| 90 | Low | Low | High | Low |
| 105 | Low | High | High | High |
| 120 | Low | High | Low | Low |

VALVE TIMING ADJUSTMENT DEVICE

CROSS REFERENCE TO RELATED APPLICATIONS

This application is a continuation application of International Patent Application No. PCT/JP2020/031155 filed on Aug. 18, 2020, which designated the U.S. and claims the benefit of priority from Japanese Patent Application No. 2019-151858 filed on Aug. 22, 2019. The entire disclosures of all of the above applications are incorporated herein by reference.

TECHNICAL FIELD

The present disclosure relates to a valve timing adjustment device.

BACKGROUND

Previously, there has been proposed a valve timing adjustment device for adjusting opening and closing timings of intake valves or exhaust valves of an internal combustion engine by an electric motor. One such valve timing adjustment device includes: a plurality of Hall elements (also referred to as Hall effect elements) that respectively output a rotation signal of the electric motor; and a control device that controls rotation of the electric motor based on outputs of the Hall elements.

SUMMARY

This section provides a general summary of the disclosure, and is not a comprehensive disclosure of its full scope or all of its features.

According to the present disclosure, there is provided a valve timing adjustment device for adjusting opening and closing timings of an intake valve or an exhaust valve of an internal combustion engine by an electric motor. The valve timing adjustment device includes a rotation signal generator, a control circuit and a signal corrector. The rotation signal generator is configured to generate a rotation speed signal and a rotation direction signal of the electric motor. The control circuit is configured to generate a control signal for commanding a target rotation speed of the electric motor and a control signal for commanding a target rotation direction of the electric motor based on edges of the rotation speed signal and edges of the rotation direction signal. The signal corrector is configured to correct an excess or a shortage of one or more edges of the rotation speed signal and an excess or a shortage of one or more edges of the rotation direction signal at a time of starting the electric motor based on: a voltage level of the rotation speed signal and a voltage level of the rotation direction signal at a time of turning off of an electric power source; the voltage level of the rotation speed signal at a time of turning on of the electric power source; and a rotation direction of the electric motor at the time of starting the electric motor.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Previously, there has been proposed a valve timing adjustment device for adjusting opening and closing timings of intake valves or exhaust valves of an internal combustion engine by an electric motor. One such valve timing adjustment device includes: a plurality of Hall elements (also referred to as Hall effect elements) that respectively output a rotation signal of the electric motor; and a control device that controls rotation of the electric motor based on outputs of the Hall elements. The control device includes a drive circuit and a control circuit. The drive circuit generates a rotation speed signal and a rotation direction signal of the electric motor based on the outputs of the Hall elements and outputs drive signals, which include the rotation speed signal and the rotation direction signal, to the control circuit.

When an actual rotation speed of the engine is less than a reference value, the control circuit generates a control command based on the rotation speed signal and the rotation direction signal received from the drive circuit and transmits a control command to the drive circuit. Then, when the actual rotation speed of the engine becomes equal to or higher than the reference value, the control circuit generates a control command based on a rotation signal of the engine (a rotation signal of a crankshaft or a camshaft) and transmits the control command to the drive circuit. Thereby, a valve timing can be appropriately adjusted according to a high level or a low level of the actual rotation speed of the engine without deteriorating a sensing accuracy of the rotation position of the electric motor in the low rotation speed range of the engine.

In the case where the rotation position of the electric motor is sensed with the sensors, such as the Hall elements, it is necessary to consider an influence of the hysteresis of the sensors. In the drive circuit that generates the motor drive signal, a voltage level of which changes according to the outputs of the Hall elements, a hysteresis range is set such that the outputs of the sensors do not fluctuate under an influence of, for example, an electromagnetic noise, and the hysteresis setting is made in the drive circuit such that the drive circuit outputs one of a High level or a Low level in a specific rotation angle range in an intermediate range that is between an N-pole and an S-pole of adjacent magnets.

However, for example, in a case of a plug-in hybrid electric vehicle (PHEV) in which the engine may often not be started during one trip, when a driver of the vehicle repeats turning on/off of an electric power source in a state where the engine is stopped, the voltage level of the drive signal may possibly change from the High level to the Low level or from the Low level to the High level although the electric motor of the valve timing adjustment device is not actually rotated due to the hysteresis setting, and thereby the control circuit may possibly erroneously recognize the rotation position of the electric motor.

According to the present disclosure, there is provided a valve timing adjustment device for adjusting opening and closing timings of an intake valve or an exhaust valve of an internal combustion engine by an electric motor. The valve timing adjustment device includes: a rotation position sensor that is configured to output a measurement signal, a voltage of which changes between two levels according to a rotation position of the electric motor; a rotation signal generator that is configured to generate a rotation speed signal and a rotation direction signal of the electric motor based on the measurement signal; a control circuit that is configured to generate a control signal for commanding a target rotation speed of the electric motor and a control signal for commanding a target rotation direction of the electric motor based on edges of the rotation speed signal and edges of the rotation direction signal; and a signal corrector that is configured to correct an excess or a shortage of one or more edges of the rotation speed signal and an excess or a shortage of one or more edges of the rotation direction signal at a time of starting the electric motor based on: a voltage level of the rotation speed signal and a voltage level of the rotation direction signal at a time of turning off of an electric power source; the voltage level of the rotation speed signal at a time of turning on of the electric power source; and a rotation direction of the electric motor at the time of starting the electric motor.

In the valve timing adjustment device of the present disclosure, an excess/shortage pattern of the signal, which is outputted irrespective of the actual rotation state of the electric motor due to the influence of the hysteresis of the rotation position sensor, is determined based on: the rotation speed signal and the rotation direction signal of the electric motor at the time of the turning off of the electric power source and the time of turning on of the electric power source; and the rotation direction of the electric motor at the time of starting the electric motor. The signal corrector corrects the excess or the shortage of the one or more edges of the rotation speed signal and the excess or the shortage of the one or more edges of the rotation direction signal at the time of starting the electric motor according to a result of the determination. Therefore, the control circuit can correctly recognize the rotation position of the electric motor and outputs the correct control signal even in the case where the electric power source of the electric motor is turned on/off by the driver of the vehicle in the state where the engine is stopped.

Figure 1:
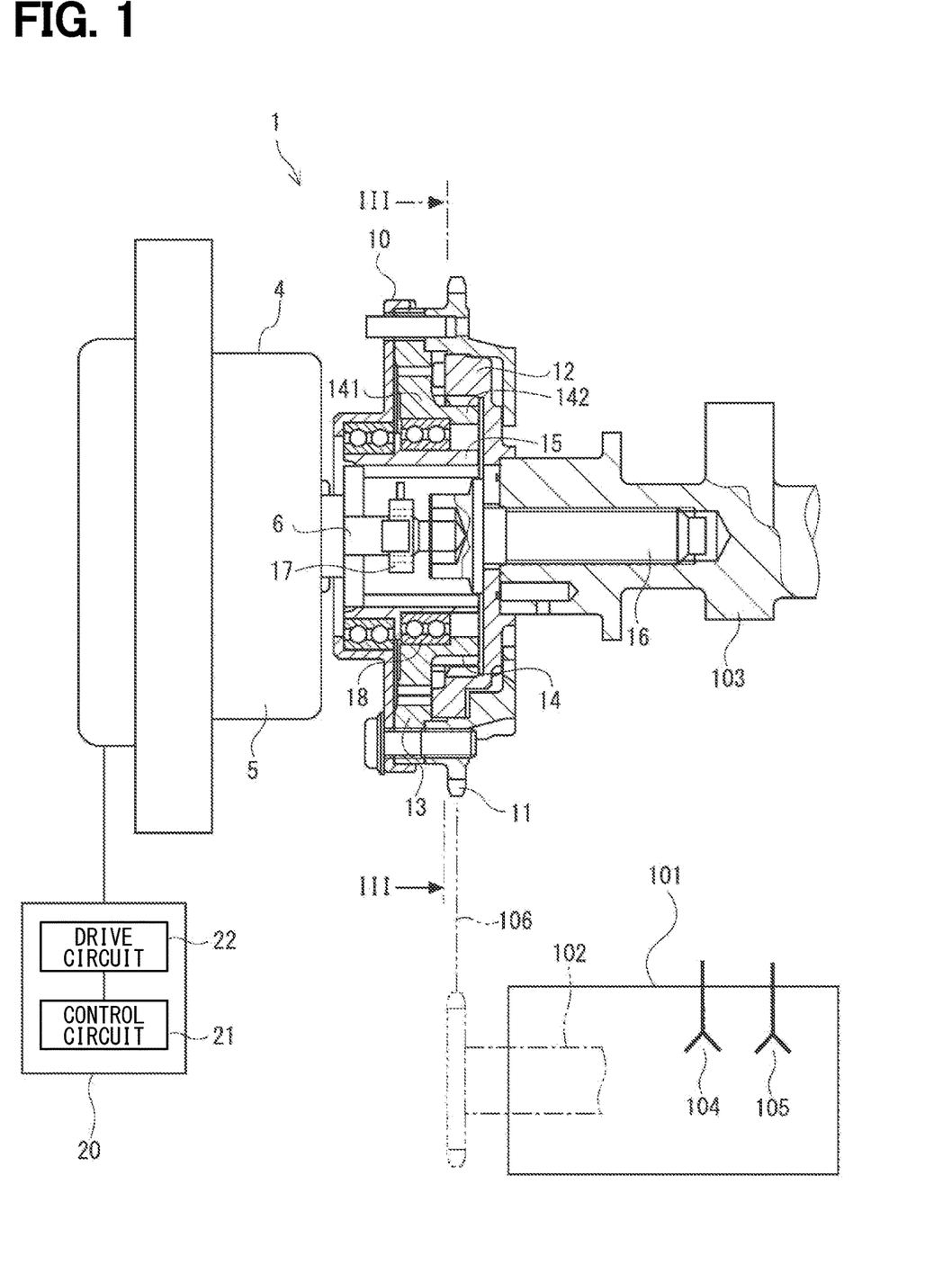
FIG. 1 is a structural diagram of a valve timing adjustment device according to an embodiment.

Hereinafter, an embodiment of the present disclosure will be described with reference to the drawings. As shown in FIG. 1, a valve timing adjustment device 1 of the present embodiment is installed to a torque transmission path which extends from a crankshaft 102 of an internal combustion engine 101 of a vehicle to a camshaft 103. The valve timing adjustment device 1 includes an electric motor 4, a phase change mechanism 10 and a control device 20. The control device 20 controls rotation of the electric motor 4. The phase change mechanism 10 is driven by a torque of the electric motor 4 to change a rotation phase of the camshaft 103 and thereby to adjust opening and closing timings of intake valves 104 or exhaust valves 105.

Figure 2:
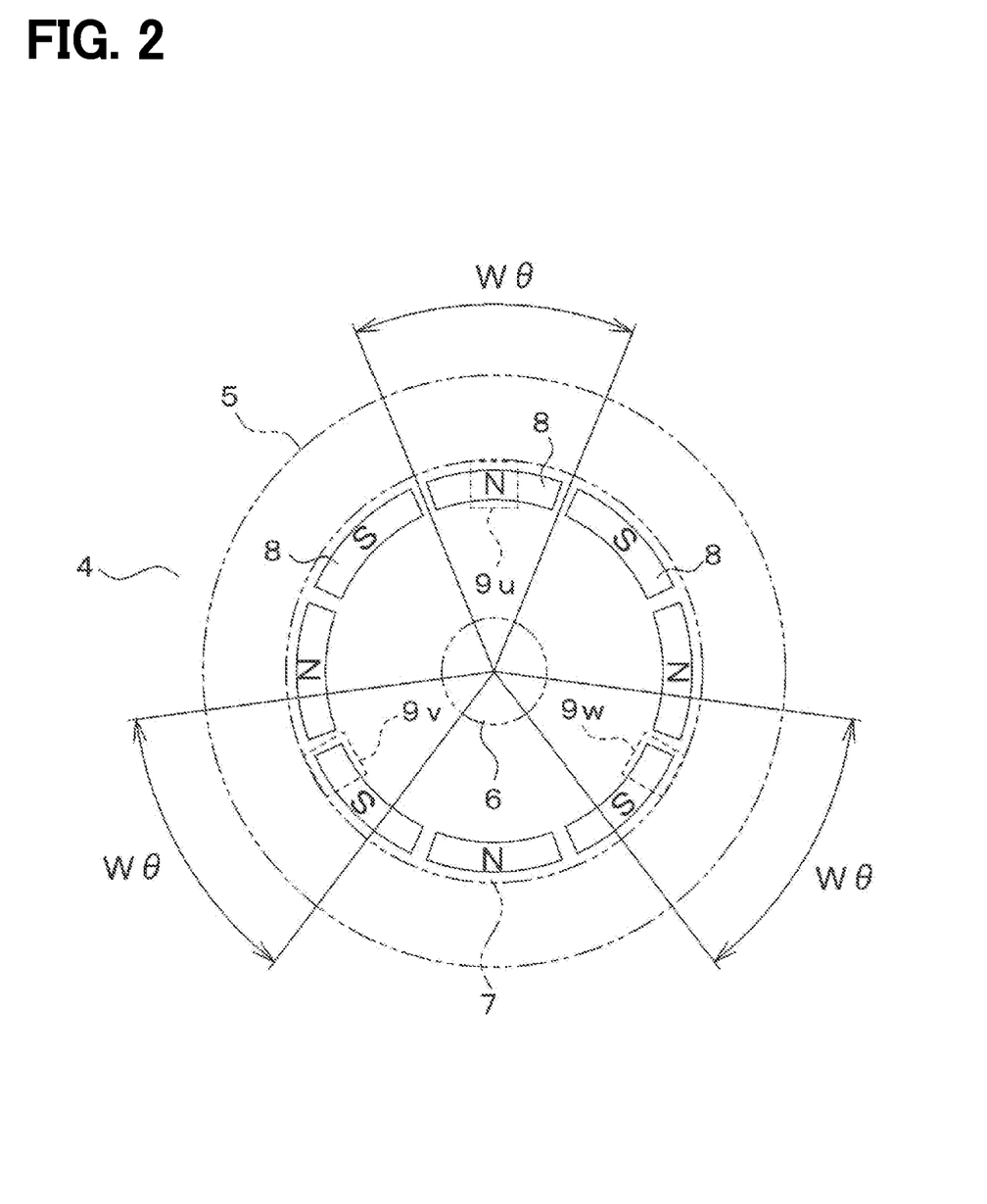
FIG. 2 is a schematic diagram of a motor's inside showing an arrangement of magnets and rotation position sensors.

A three-phase brushless motor is used as the electric motor 4. A casing 5 of the electric motor 4 supports a motor shaft 6. Furthermore, the casing 5 receives: a rotor, which is rotated integrally with the motor shaft 6; and a stator (not shown), which generates a rotating magnetic field. As shown in FIG. 2, the rotor 7 has, for example, eight magnets 8 which are circumferentially arranged at 45 degree intervals about the motor shaft 6 in a state where N-poles and S-poles of the magnets 8 are alternately arranged in the circumferential direction. Three Hall sensors (also referred to as Hall effect sensors) $9u$, $9v$, $9w$, which serve as rotation position sensors for sensing a rotation position of the electric motor 4, are arranged at 120 degree intervals in the circumferential direction at an inside of the casing 5 such that the Hall sensors $9u$, $9v$, $9w$ are opposed to the magnets 8. Each of the Hall sensors $9u$, $9v$, $9w$ outputs a measurement signal, a voltage level of which changes according to the rotation position of the electric motor 4.

Figure 3:
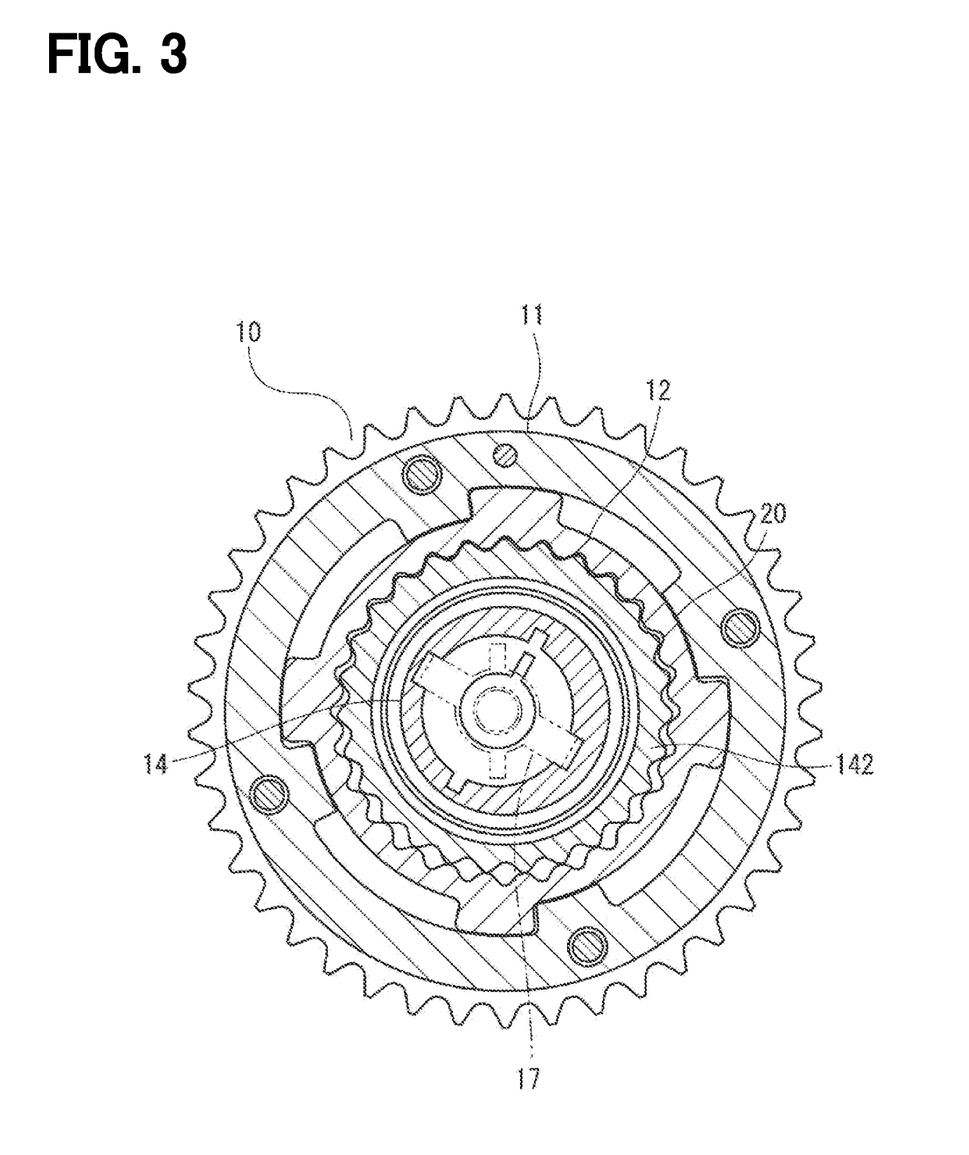
FIG. 3 is a cross-sectional view taken along the line III-III in FIG. 1 showing a phase change mechanism.

As shown in FIGS. 1 and 3, the phase change mechanism 10 includes a sprocket 11, a cup-shaped internal gear 12, a ring-shaped internal gear 13, a planetary gear 14 and an eccentric shaft 15. The sprocket 11 is coupled to the crankshaft 102 through a chain 106 and is joined to the camshaft 103 and the cup-shaped internal gear 12 by a bolt 16 to rotate integrally with the camshaft 103 and the cup-shaped internal gear 12. The cup-shaped internal gear 12 is engaged with a uniform small-radius portion 142 of the planetary gear 14, and a large-diameter eccentric portion 141 of the planetary gear 14 is engaged with the ring-shaped internal gear 13. The planetary gear 14 is supported by the eccentric shaft 15 through a bearing 18, and the eccentric shaft 15 is coupled to the motor shaft 6 through a movable shaft joint 17.

In a state where an electric power is not supplied from an electric power source to the electric motor 4, the cup-shaped internal gear 12 is rotated integrally with the sprocket 11 while maintaining the engaged position of the cup-shaped internal gear 12 relative to the planetary gear 14 in response to rotation of the crankshaft 102. Therefore, a rotation phase of the camshaft 103 relative to the crankshaft 102 is kept constant, that is, the opening and closing timings of the intake valves or the exhaust valves are kept constant. In contrast, when the electric power is supplied from the electric power source to the electric motor 4, the eccentric shaft 15 is rotated integrally with the motor shaft 6. Therefore, the engaged position of the cup-shaped internal gear 12 relative to the planetary gear 14 and the engaged position of the ring-shaped internal gear 13 relative to the planetary gear 14 are changed. Thus, the rotation speed of the sprocket 11 and the camshaft 103 is increased or decreased, and thereby the opening and closing timings of the valves are adjusted to the advancing side or the retarding side.

The control device 20 generates control signals for controlling the operation of the electric motor 4 and includes a control circuit 21 and a drive circuit 22. The control circuit 21 controls operations of ignition devices and fuel injection devices (not shown) of the engine 101. The drive circuit 22 energizes and drives the electric motor 4 according to control signals generated by the control circuit 21. Although the control circuit 21 and the drive circuit 22 are indicated at the outside of the casing 5 of the electric motor 4 in FIG. 1, the locations of the control circuit 21 and the drive circuit 22 can be appropriately set depending on a need.

Figure 4:
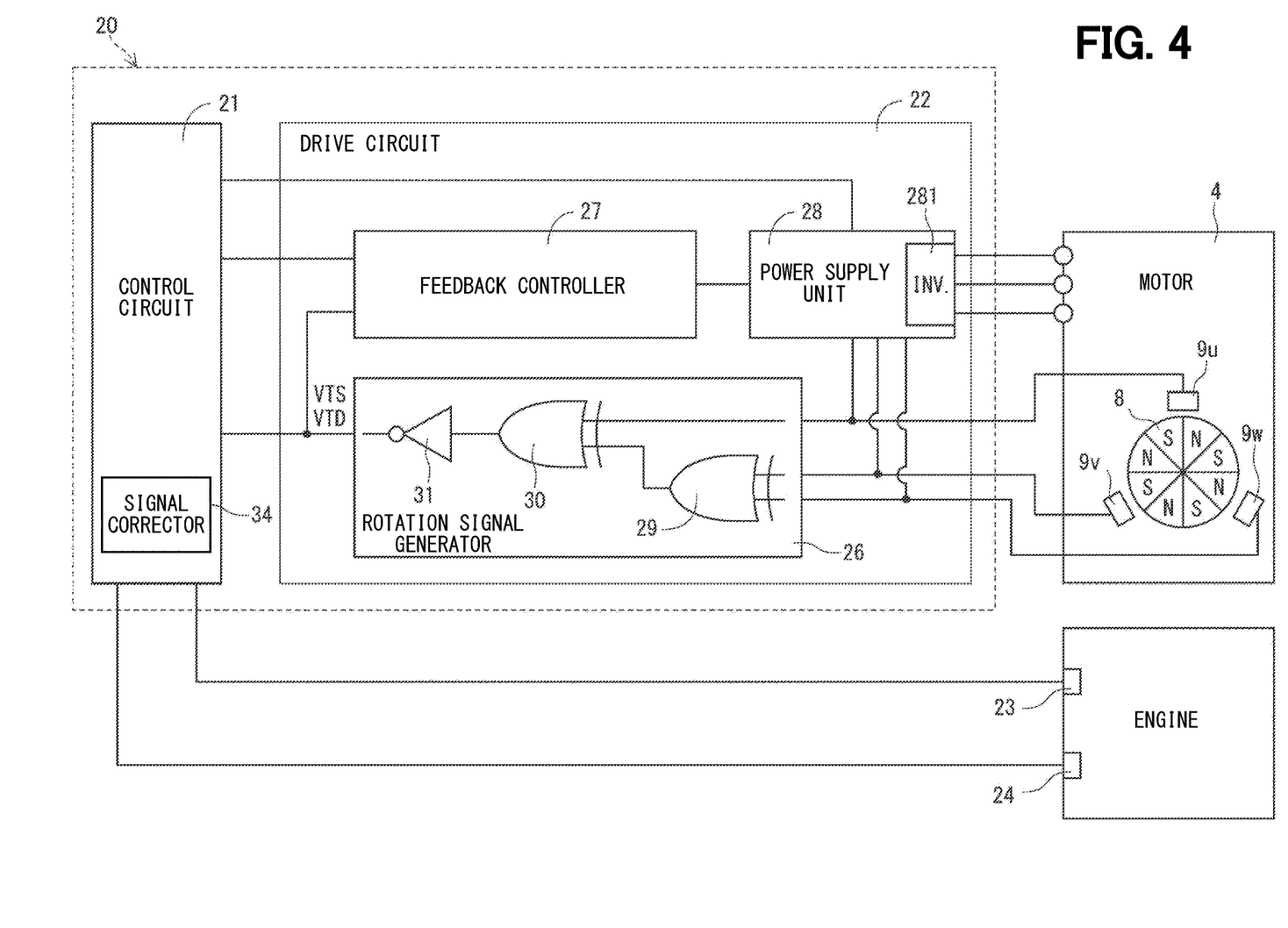
FIG. 4 is a block diagram showing a control circuit and a drive circuit of a control device.

As shown in FIG. 4, a first rotation sensor 23, which senses an actual rotation speed of the camshaft 103, and a second rotation sensor 24, which senses an actual rotation speed of the crankshaft are connected to the control circuit 21. The control circuit 21 generates a control signal for commanding a target rotation speed of the electric motor 4 and a control signal for commanding a target rotation direction of the electric motor 4 based on the actual rotation speed of the camshaft 103, the actual rotation speed of the crankshaft 102, and a rotation speed signal and a rotation direction signal of the electric motor 4 received from a rotation signal generator 26. Then, the control circuit 21 transmits the generated control signals to the drive circuit 22.

The drive circuit 22 includes the rotation signal generator 26, a feedback controller 27 and a power supply unit 28. The rotation signal generator 26 generates the rotation speed signal and the rotation direction signal of the electric motor 4 based on outputs of the Hall sensors 9. The rotation signal generator 26 includes two XOR gates 29, 30 and an inverter gate 31. Measurement signals of the Hall sensors 9v, 9w are inputted to the first XOR gate 29. A measurement signal of the Hall sensor 9u and an output signal of the first XOR gate 29 are inputted to the second XOR gate 30. An output signal of the second XOR gate 30 is inputted to the inverter gate 31.

The rotation signal generator 26 changes a voltage level every time an edge is generated in any one of the measurement signals inputted from the three Hall sensors 9u, 9v, 9w. The rotation signal generator 26 generates: a rotation speed signal VTS indicating an actual rotation speed of the electric motor 4 based on a time difference between the edges; and a rotation direction signal VTD indicating an actual rotation direction of the electric motor 4 based on a generation sequence of the edges. Then, the rotation signal generator 26 transmits the rotation speed signal VTS and the rotation direction signal VTD to the control circuit 21 and the feedback controller 27.

The feedback controller 27 receives the rotation speed signal VTS and the rotation direction signal VTD from the rotation signal generator 26 and receives the control signals, which respectively indicate the target rotation speed and the target rotation direction, from the control circuit 21. Then, the feedback controller 27 determines a drive voltage for coinciding the actual rotation speed, which is indicated by the rotation speed signal VTS, to the target rotation speed, which is indicated by the control signal. The power supply unit 28 changes ON/OFF of switching devices of an inverter circuit (indicated by INV in the drawing) 281 such that a drive voltage, which is received from the feedback controller 27, is applied to windings (not shown) wound around the stator of the electric motor 4.

Figure 5A:
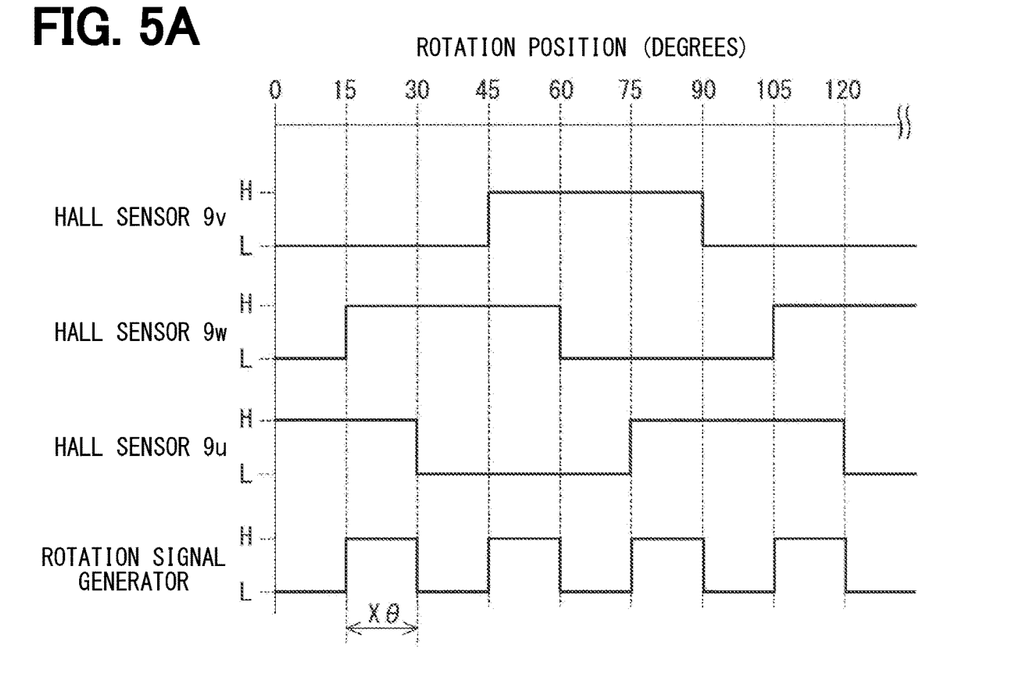
FIG. 5A is an operation explanatory diagram of the drive circuit showing a correlation between outputs of the rotation position sensors and an output of a rotation signal generator.

Next, a correction process for the signals outputted from the rotation signal generator 26 will be described. As shown in FIG. 2, each of the three Hall sensors 9u, 9v, 9w has a sensing range Wθ (Wθ=45 degrees) which is equal to an arrangement angle of the respective magnets 8. When the N-pole of one of the magnets 8 is included in this sensing range Wθ of the Hall sensor 9u, 9v, 9w, the Hall sensor 9u, 9v, 9w outputs the high level voltage. Furthermore, when the S-pole of one of the magnets 8 is included in this sensing range Wθ of the Hall sensor 9u, 9v, 9w, the Hall sensor 9u, 9v, 9w outputs the low level voltage. Then, as indicated in FIG. 5A, each of the three Hall sensors 9u, 9v, 9w changes the voltage level between two levels, i.e., changes the voltage level from High (H) to Low (L) and from Low (L) to High (H) according to the rotation position of the electric motor 4 and outputs the measurement signal, which indicates the actual rotation position of the electric motor 4, to the drive circuit 22.

Figure 5B:
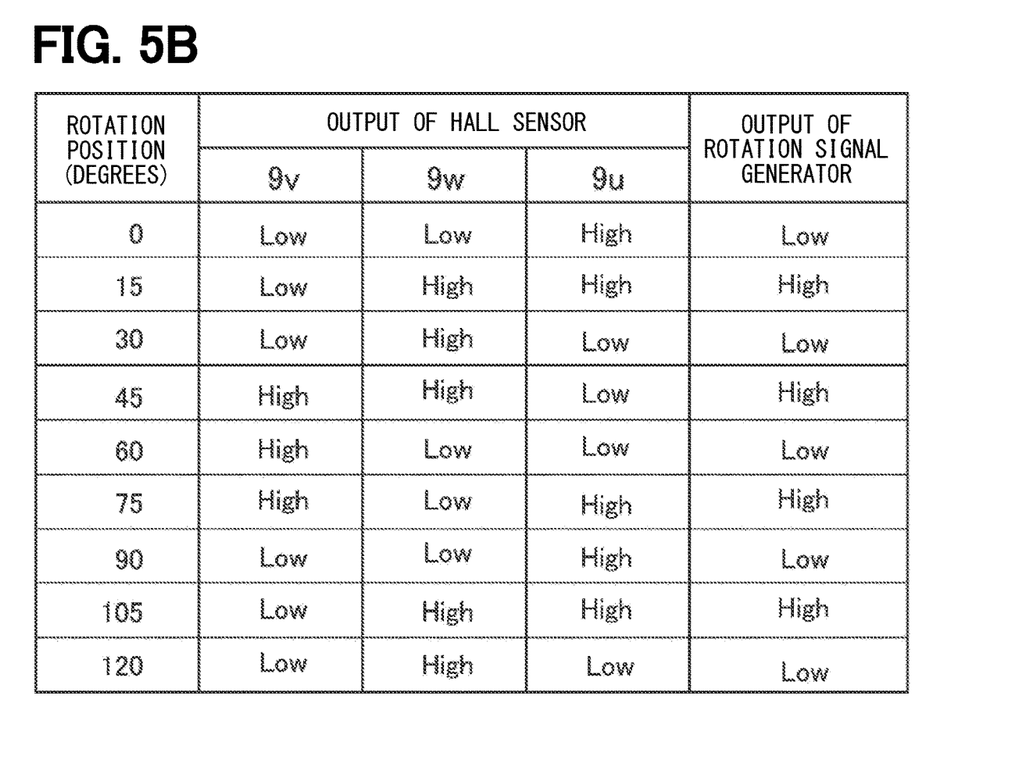
FIG. 5B is an operation explanatory diagram of the drive circuit showing a correlation between a rotation position of the electric motor and a signal level.

The drive circuit 22 is configured as follows. Specifically, as shown in FIG. 5B, when two of the three Hall sensors 9u, 9v, 9w output the High level, the rotation signal generator 26 outputs a High level signal. Furthermore, when two of the three Hall sensors 9u, 9v, 9w output the Low level, the rotation signal generator 26 outputs a Low level signal. Therefore, in this embodiment, the High level signal or the Low level signal is outputted every angle range Xθ (Xθ=15 degrees in FIG. 5A) that corresponds to one third of the sensing range Wθ of the Hall sensor 9.

Figure 6A:
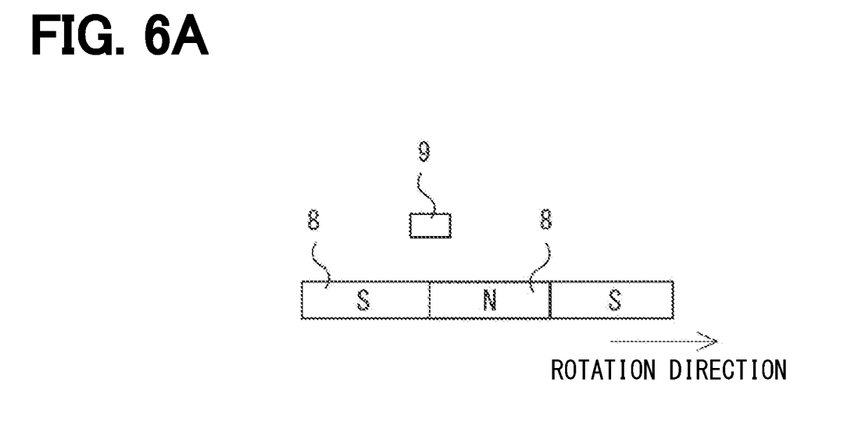
FIG. 6A is an operation explanatory diagram of the rotation position sensor showing a relative position between the sensor and the magnets.
Figure 6B:
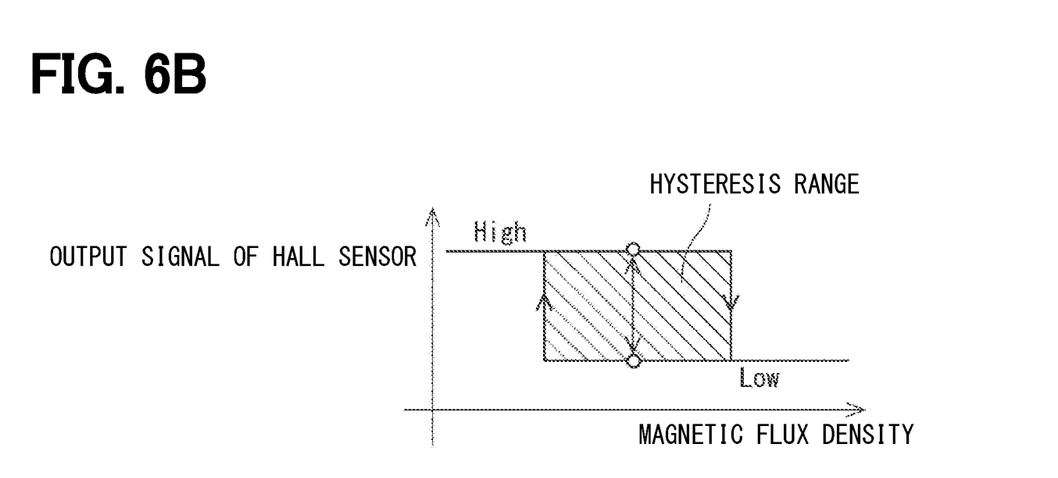
FIG. 6B is an operation explanatory diagram of the rotation position sensor showing the behavior of the sensor in a hysteresis range.

By the way, as described above, in the PHEV vehicle or the like, when the turning on/off of the electric power source is repeated in the state where the engine is stopped, there is the possibility that the output of the rotation signal generator 26 in the hysteresis region of the Hall sensor 9 changes irrespective of the actual rotation state of the electric motor 4. It is common to set the hysteresis region such that, for example, as shown in FIG. 6A, at the time when the Hall sensor 9 enters the vicinity of the intermediate position between the S-pole and the N-pole in response to the relative rotation between the magnets 8 and the Hall sensor 9, an occurrence of fluctuation of the output voltage of the Hall sensor 9 between the High level and the Low level is limited, as shown in FIG. 6B.

Therefore, when the supply of the electric power from the electric power source to the electric motor 4 is turned off (i.e., when the drive circuit 22 is stopped), the output of the rotation signal generator 26 may possibly change to the High level or the Low level due to the influence of the hysteresis although the electric motor is not rotated. In view of the above point, in the drive circuit 22 of the present embodiment, a signal corrector 34 (see FIG. 4) is provided in the control circuit 21. The signal corrector 34 corrects an excess or a shortage of an edge of the rotation speed signal VTS and an excess or a shortage of an edge of the rotation direction signal VTD at the time of starting the electric motor 4 based on: the signal level at the time of turning off of the electric power source of the electric motor 4; the signal level at the time of turning on of the electric power source of the electric motor 4; and the rotation direction of the electric motor 4 at the time of starting the electric motor 4.

Figure 7:
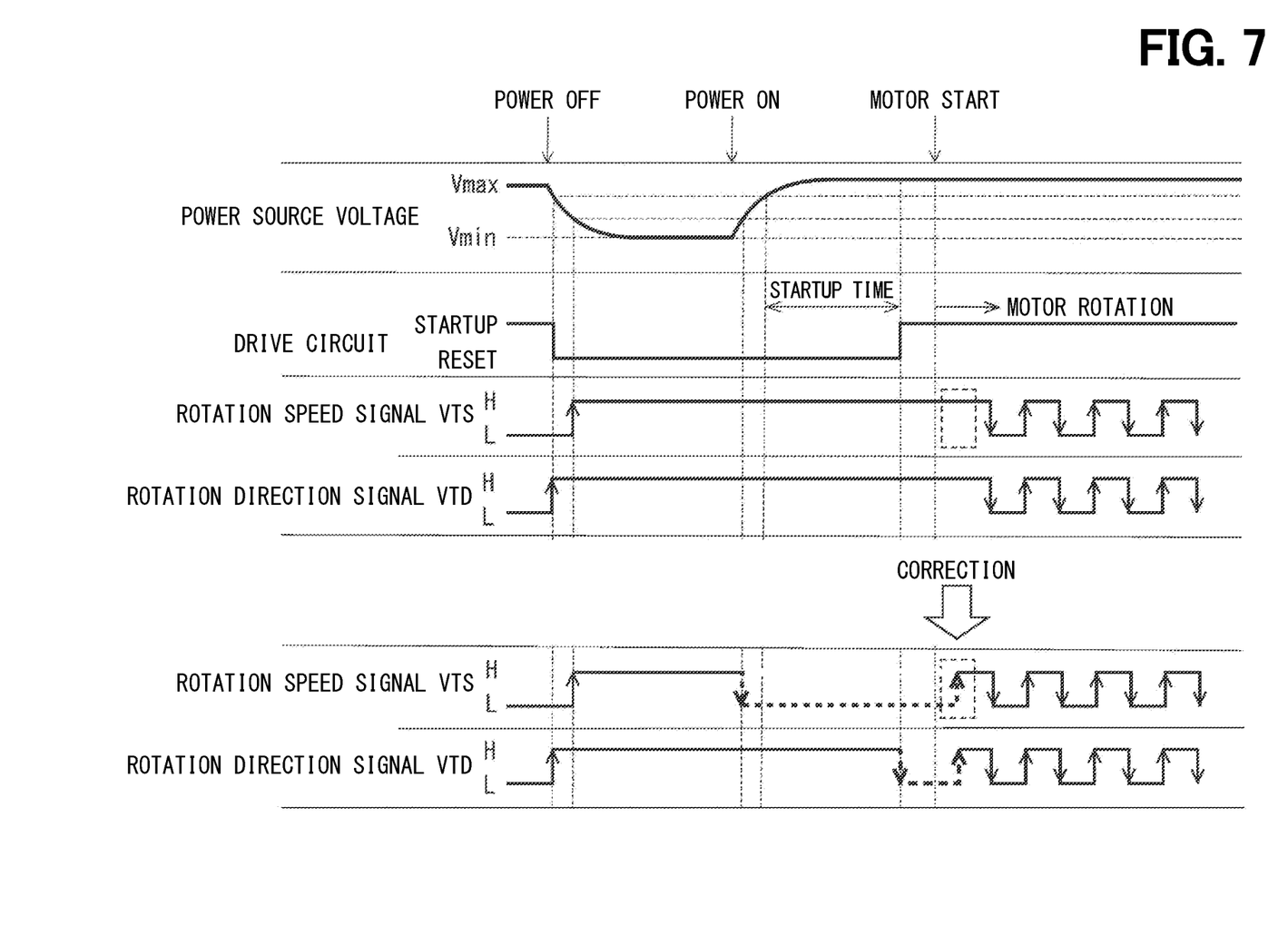
FIG. 7 is a time chart showing a correction principle of a motor drive signal.

For example, as shown in FIG. 7, when the electric power source of the electric motor 4 is turned off in the state where the engine 101 is stopped, the drive circuit 22 is reset. Therefore, the voltage level of each of the rotation speed signal VTS and the rotation direction signal VTD, which are outputted from the rotation signal generator 26, is changed from the Low level to the High level. After that, even when the startup time of the drive circuit 22 elapses after the turning on of the electric power source of the electric motor 4, the signal level of each of the rotation speed signal VTS and the rotation direction signal VTD does not change and is still kept to the High level. Then, the signal level is changed from the High level to the Low level after elapse of the start timing of the electric motor 4. However, at this stage, when trying to rotate the electric motor 4 in the forward direction, a shortage of one edge in the rotation speed signal VTS and a shortage of one edge in the rotation direction signal VTD occur at the time of starting the electric motor 4. Therefore, the signal corrector 34 corrects the signal level at the time of starting the electric motor 4 and thereby adds one rising edge to each of the rotation speed signal VTS and the rotation direction signal VTD.

Figure 8:
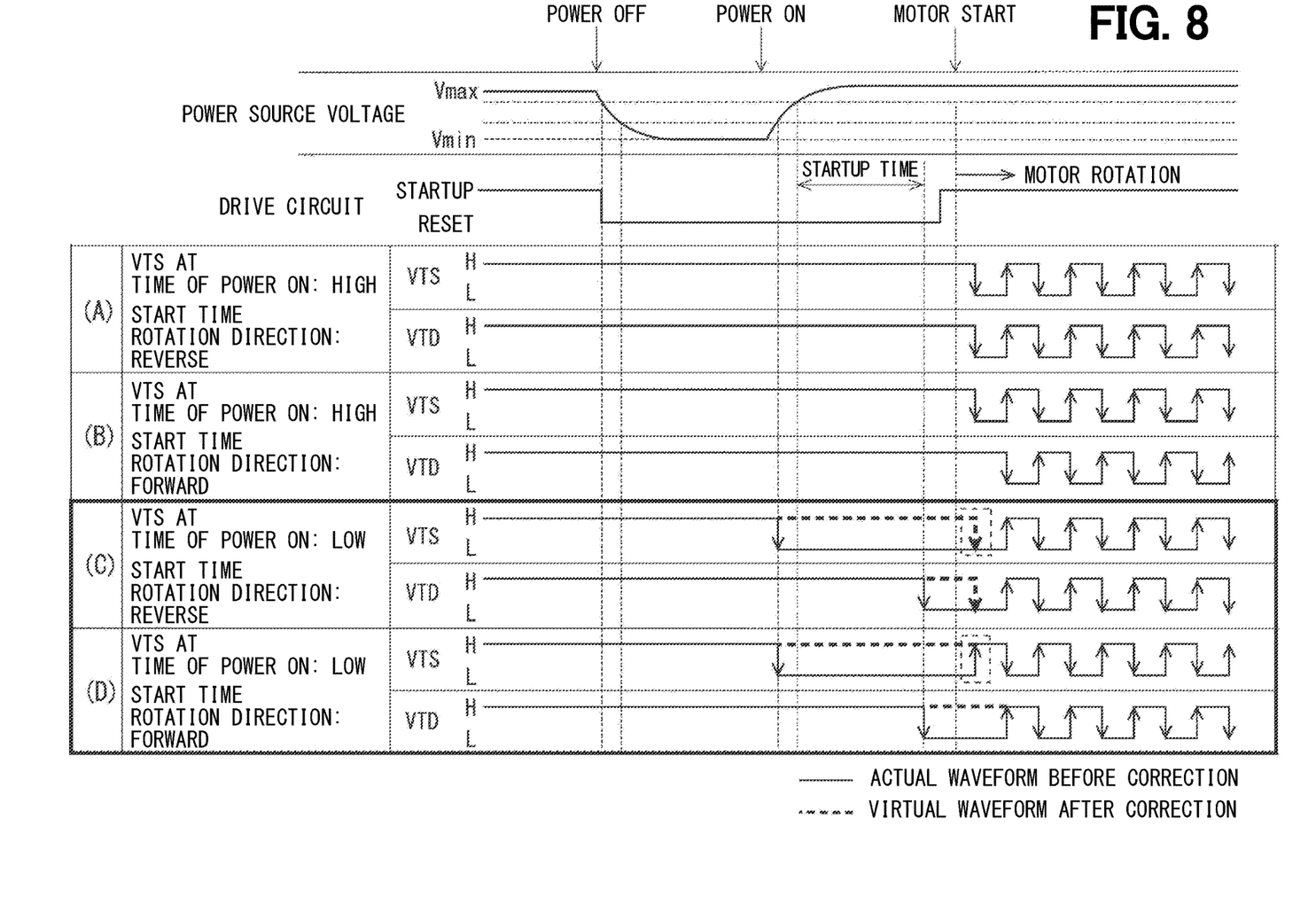
FIG. 8 is a time chart showing an example of correction of the drive signal by a signal corrector.

As described above, the signal correction at the time of starting the electric motor is executed based on a combination of: the signal level (an initial set value of the drive circuit 22) at the time of turning off of the electric power source; the signal level at the time of turning on the electric power source; and the rotation direction of the electric motor at the time of starting the electric motor 4. In FIG. 8, a bold line surrounds one combination pattern, which requires the signal correction. In the correction example shown in FIG. 8, High (H) of the rotation direction signal VTD indicates the forward rotation of the electric motor 4, and Low (L) of the rotation direction signal VTD indicates the reverse rotation of the electric motor 4. Furthermore, a solid line waveform indicates an actual waveform which is generated by the rotation signal generator 26 and is before the correction, and a dotted line waveform indicates a virtual waveform after the correction.

(A) to (D) of FIG. 8 indicate correction examples in the case where the rotation speed signal VTS and the rotation direction signal VTD are both set to the High level at the time of turning off of the electric power source (power OFF), i.e., the time of resetting the drive circuit. (A) indicates the operation in a case where the rotation speed signal VTS at the time of turning on of the electric power source (power ON), i.e., the time of starting the drive circuit is the High level, and the rotation direction of the electric motor at the time of starting the electric motor is the reverse direction. In this case, since there is no excess or shortage of the edge in the rotation speed signal VTS at the time of starting the electric motor, the correction is not executed. (B) indicates the operation in a case where the rotation speed signal VTS at the time of turning on of the electric power source (power ON) is the High level, and the rotation direction of the electric motor at the time of starting the electric motor is the forward direction. In this case, since there is no excess or shortage of the edge in the rotation speed signal VTS at the time of stating the electric motor, the correction is not executed.

(C) indicates the operation in a case where the rotation speed signal VTS at the time of turning on of the electric power source (power ON) is the Low level, and the rotation direction of the electric motor at the time of starting the electric motor is the reverse direction. In this case, there is a shortage of one edge in the rotation speed signal VTS at the time of starting the electric motor, so that the signal corrector 34 executes the correction of adding one falling edge. (D) indicates the operation in a case where the rotation speed signal VTS at the time of turning on of the electric power source (power ON) is the Low level, and the rotation direction of the electric motor at the time of starting the electric motor is the forward direction. In this case, there is an excess of one edge in the rotation speed signal VTS at the time of starting the electric motor, so that the signal corrector 34 executes the correction of removing one rising edge.

Therefore, according to the valve timing adjustment device 1 of the present embodiment, the excess/shortage pattern of the signal, which is outputted irrespective of the actual rotation state of the electric motor 4 under the influence of the hysteresis of the Hall sensor 9, is determined. Then, based on this excess/shortage pattern of the signal, the signal corrector 34 corrects the excess/shortage of the edge of each of the rotation speed signal VTS and the rotation direction signal VTD at the time of starting the electric motor. Therefore, even when the electric power source of the electric motor 4 is turned on/off by the driver of the vehicle in the state where the engine 101 is stopped, the control circuit 21 can correctly recognize the rotation position of the electric motor 4 and generate a control command.

OTHER EMBODIMENTS

It should be noted that the present disclosure is not limited to the above embodiment, and for example, as illustrated in the following (1) to (5), the shape and/or the configuration of each corresponding component can be arbitrarily changed without departing from the spirit of the present disclosure.

(1) In the above embodiment, although the signal corrector 34 corrects one edge, the number of edge(s) is not particularly limited to one. For example, two or more edges may be added or removed instead of the one edge.

Figure 9:
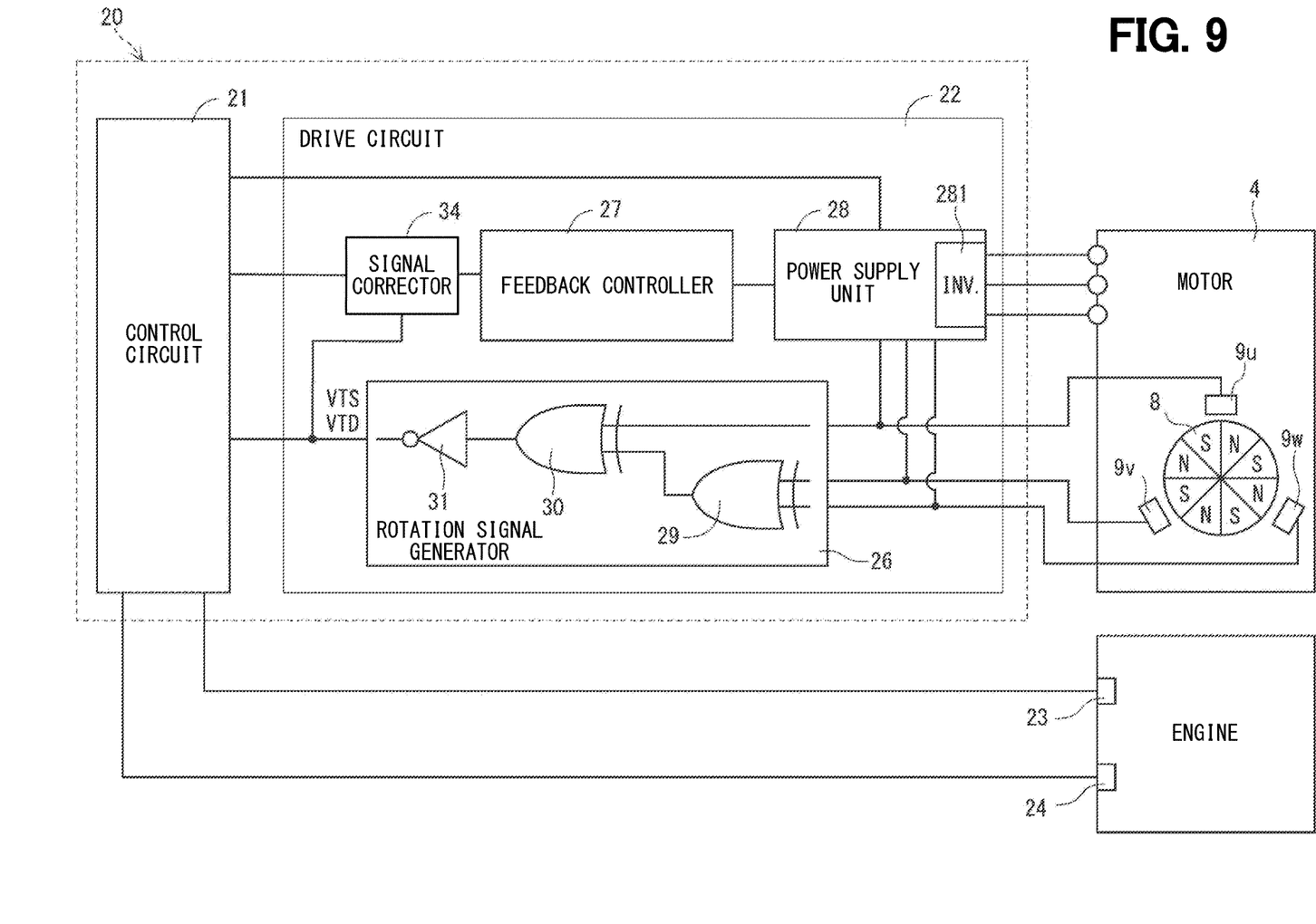
FIG. 9 is a block diagram showing a modification of a motor control device.

(2) In the above embodiment, the signal corrector 34 is provided in the control circuit 21. Alternatively, as shown in FIG. 9, the signal corrector 34 may be provided in the drive circuit 22 and may function in the same way as that of the above embodiment.

(3) In the above embodiment, the Hall sensors 9 are used as the rotation position sensors. Alternative to the Hall sensors 9, it is possible to use various other types of sensors in which the hysteresis has an influence on a voltage level of a measurement signal thereof.

(4) In the embodiment shown in FIG. 1, both the control circuit 21 and the drive circuit 22 are placed at the outside of the casing 5 of the electric motor 4. Alternatively, the drive circuit 22 may be placed at the inside of the casing 5, and the control circuit 21 may be placed at the outside of the casing 5.

(5) It is also possible to place a part of the drive circuit 22 at the inside of the casing 5 and place the rest of the drive circuit 22 and the control circuit 21 at the outside of the casing 5.

The control device and the control method thereof described in the present disclosure may be implemented by a special purpose computer which is configured with a memory and a processor programmed to execute one or more particular functions embodied in computer programs of the memory. Alternatively, the control device and the control method thereof described in the present disclosure may be realized by a dedicated computer configured as a processor with one or more dedicated hardware logic circuits. Alternatively, the control device and the control method thereof described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been described in accordance with the embodiments. However, the present disclosure is not limited to such embodiments. The present disclosure also includes various variations and variations within an equivalent range. Furthermore, various combinations and forms, as well as other combinations and forms that include only one element, more, or less thereof, are within the scope and ideas of the present disclosure.

What is claimed is:

1. A valve timing adjustment device for adjusting opening and closing timings of an intake valve or an exhaust valve of an internal combustion engine by an electric motor, comprising:

a rotation position sensor that is configured to output a measurement signal, a voltage of which changes between two levels according to a rotation position of the electric motor;

a rotation signal generator that is configured to generate a rotation speed signal and a rotation direction signal of the electric motor based on the measurement signal;

a control circuit that is configured to generate a control signal for commanding a target rotation speed of the electric motor and a control signal for commanding a target rotation direction of the electric motor based on edges of the rotation speed signal and edges of the rotation direction signal; and a signal corrector that is configured to correct an excess or a shortage of one or more edges of the rotation speed signal and an excess or a shortage of one or more edges of the rotation direction signal at a time of starting the electric motor based on: a voltage level of the rotation speed signal and a voltage level of the rotation direction signal at a time of turning off of an electric power source; the voltage level of the rotation speed signal at a time of turning on of the electric power source; and a rotation direction of the electric motor at the time of starting the electric motor.

2. The valve timing adjustment device according to claim 1, wherein the signal corrector is configured to correct each of the rotation speed signal and the rotation direction signal by adding one edge to or removing one edge from each of the rotation speed signal and the rotation direction signal at the time of starting the electric motor.

* * * * *